No. 636,209. Patented Oct. 31, 1899.
J. E. O. KUMBERG.
TELEPHONOGRAPH.
(Application filed Aug. 14, 1899.)
(No Model.) 4 Sheets—Sheet 2.
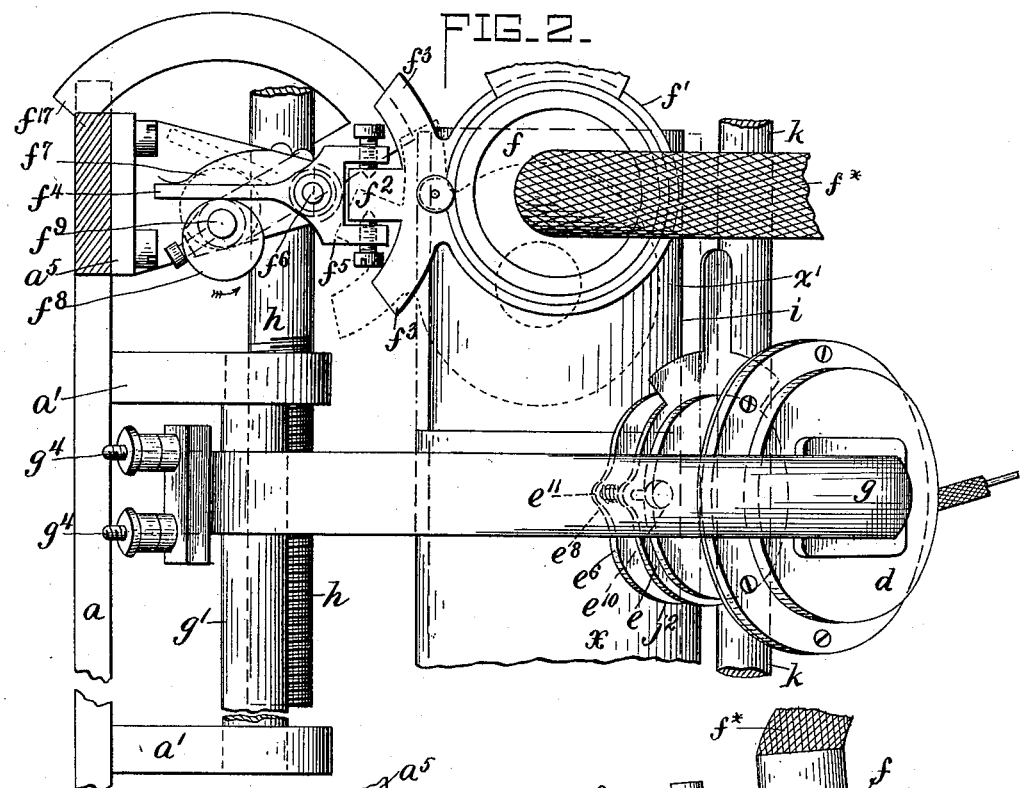
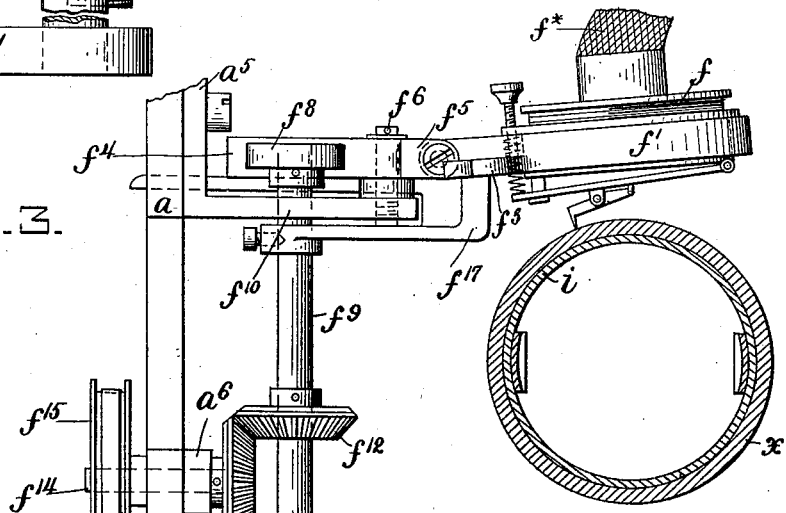
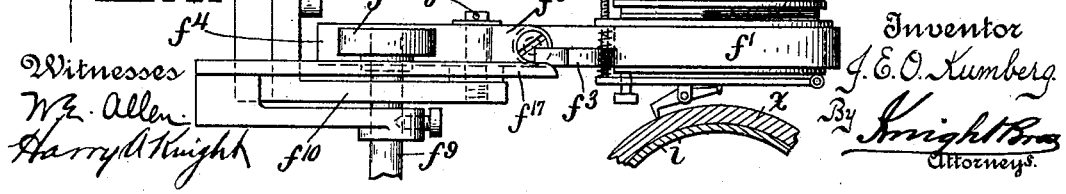
Witnesses
W. E. Allen
Harry A. Knight
Inventor
J. E. O. Kumberg
By Knight Bros
Attorneys No. 636,209. Patented Oct. 31, 1899.
J. E. O. KUMBERG.
TELEPHONOGRAPH.
(Application filed Aug. 14, 1899.)
(No Model.) 4 Sheets—Sheet 3.
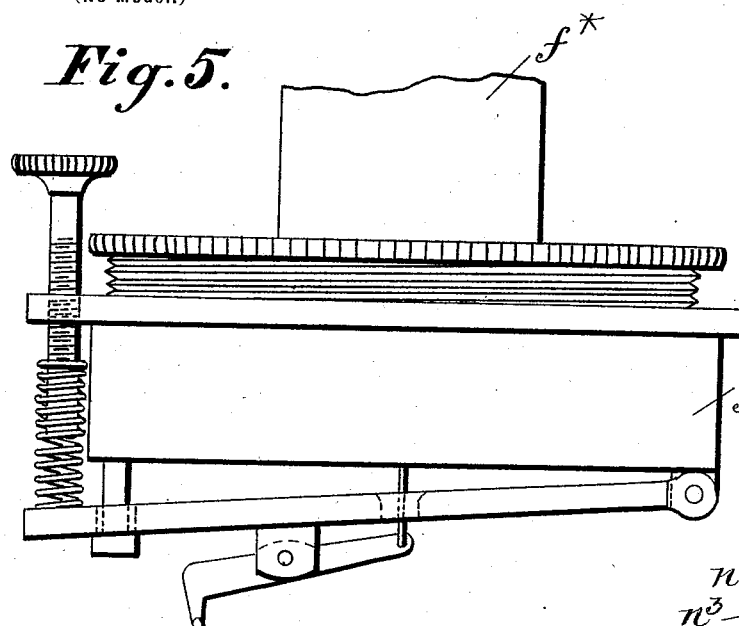
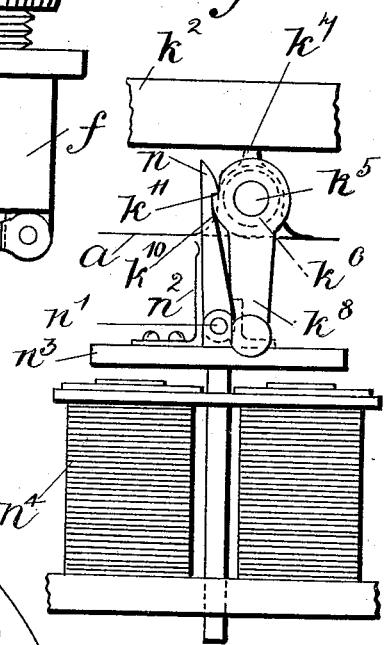
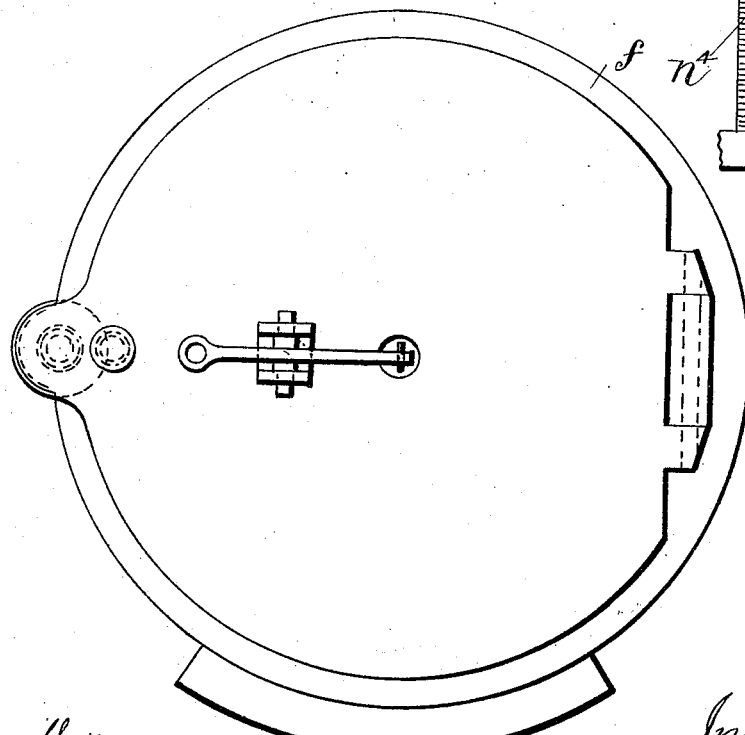
Witnesses
Harry A. Knight
Anna E. Lamb
Inventor
Jules Ernest Othon Kumberg
By Knight Bros
Attys No. 636,209. Patented Oct. 31, 1899.
J. E. O. KUMBERG.
TELEPHONOGRAPH.
(Application filed Aug. 14, 1899.)
(No Model.) 4 Sheets—Sheet 4.
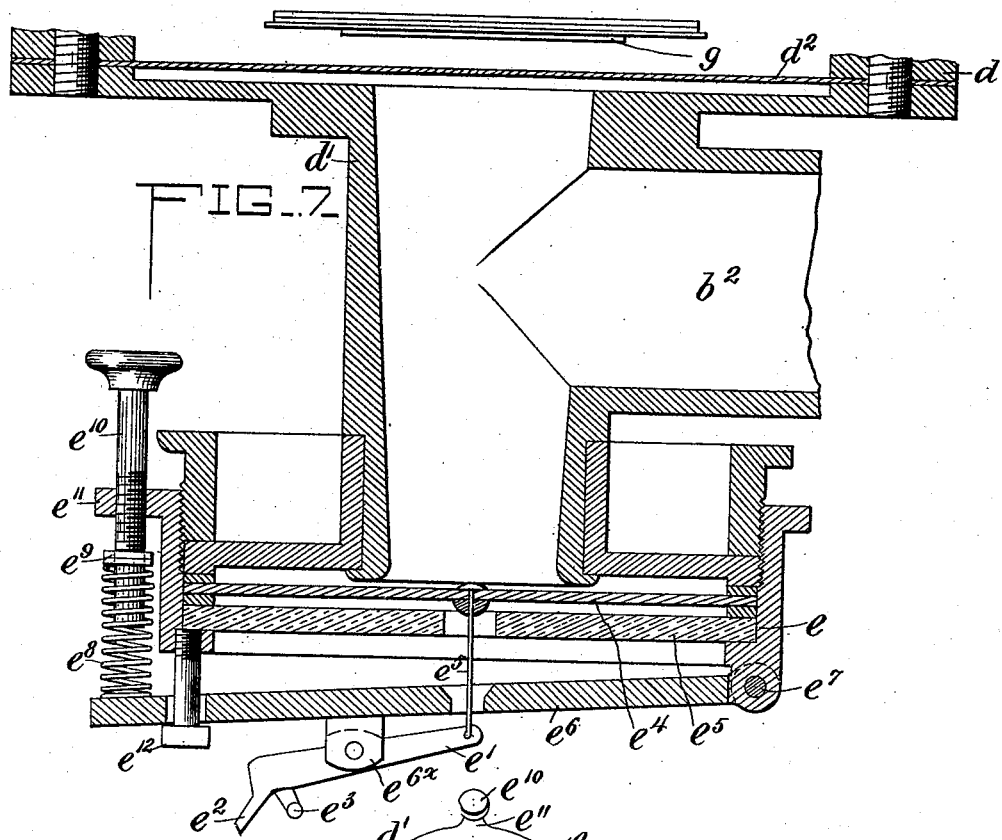
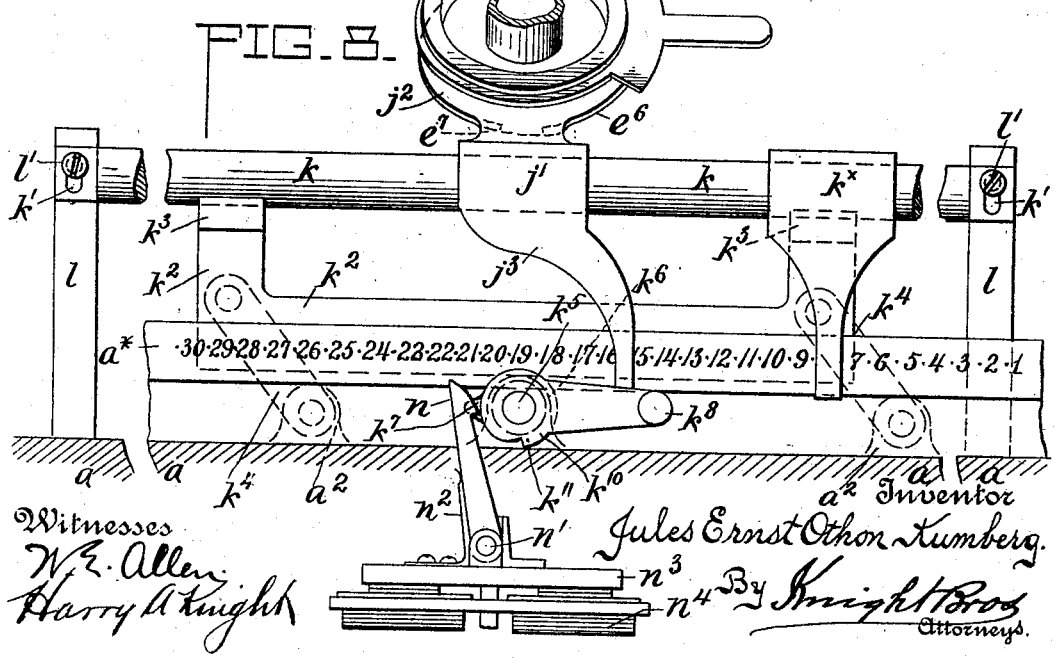

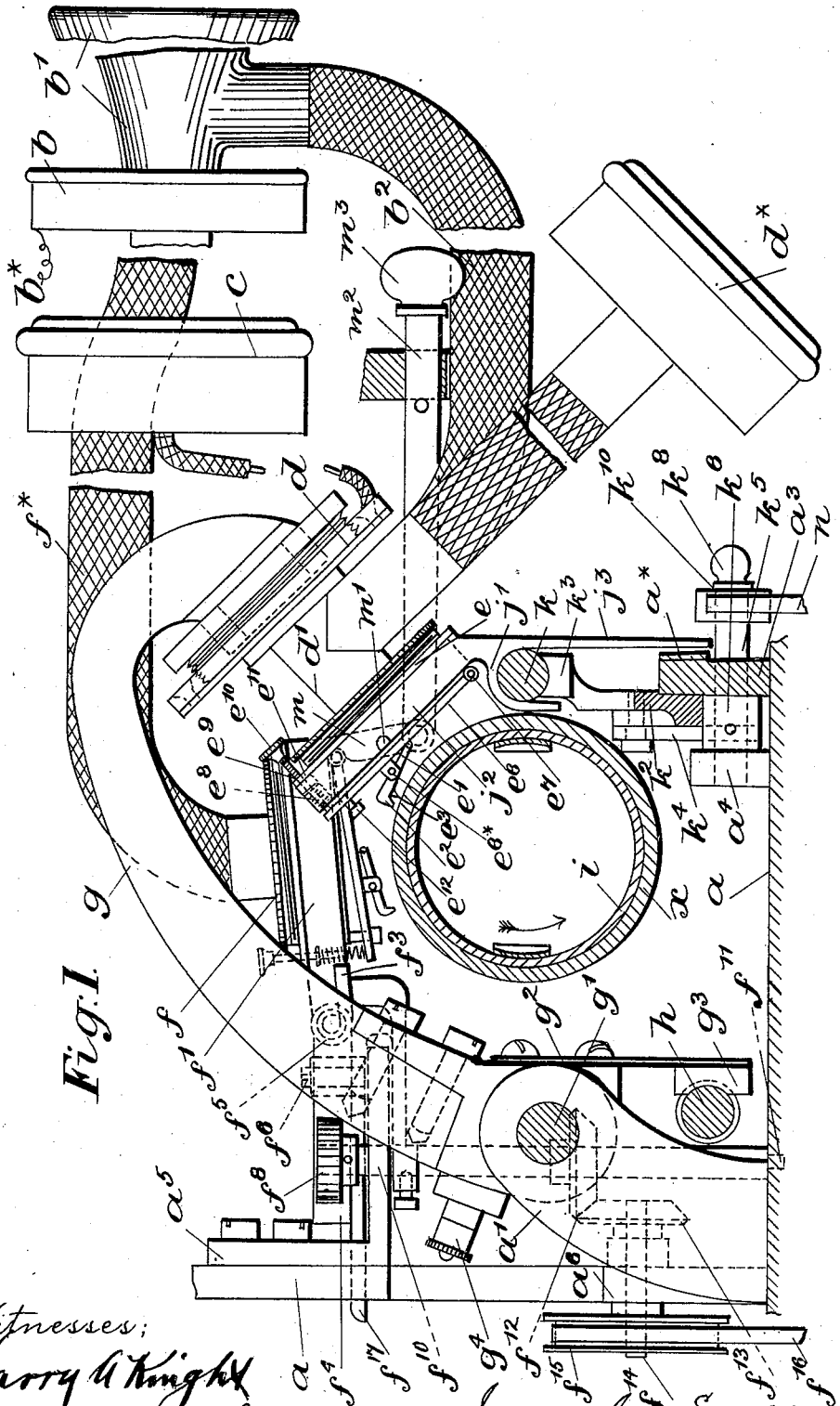

UNITED STATES PATENT OFFICE.

JULES ERNEST OTHON KUMBERG, OF LONDON, ENGLAND.

TELEPHONOGRAPH.

SPECIFICATION forming part of Letters Patent No. 636,209, dated October 31, 1899.

Application filed August 14, 1899. Serial No. 727,238. (No model.)

*To all whom it may concern:*

Be it known that I, JULES ERNEST OTHON KUMBERG, French civil engineer, a citizen of the Republic of France, residing at 321 Milk-wood road, Herne Hill, London, in the county of Surrey, England, have invented certain new and useful Improvements in or Connected with Telephones, of which the following is a specification, reference being had to the accompanying drawings and to the letters marked thereon.

The object of the invention is to obtain an instrument which will record telephonic conversations or other sounds both at the transmitting and receiving stations and which will repeat to a person at a distant station short messages thus recorded; and the invention comprises the peculiar combination and arrangement of parts hereinafter described.

In the accompanying drawings, Figure 1 is a side elevation, partly in section, representing an instrument constructed according to the present invention and showing the cutting-point of the recording instrument in engagement with the long phonogram blank or cylinder and the stylus of the reproducing instrument out of engagement with the short cylinder. Fig. 2 is a plan of part thereof. Fig. 3 is a detail view of part of Fig. 1. Fig. 4 represents part of Fig. 3, but showing the stylus of the reproducing-diaphragm in engagement with the short phonogram or cylinder. Fig. 5 is a side elevation of the reproducer separately. Fig. 6 is a plan thereof.
Fig. 7 is a vertical section of the recording instrument separately. Fig. 8 is a front elevation of part of the instrument, illustrating more particularly the means for throwing the recording-stylus out of action and also the divided scale and pointer; and Fig. 9 represents part of Fig. 8, showing the operative parts in their opposite position.

In the several figures, in which like parts are indicated by similar letters of reference, Figs. 5 to 7 are drawn to an increased scale with respect to the other figures of the drawings.

$a$ represents the base-plate and frame of the instrument.

$b$ represents the transmitter, which may be of any well-known and highly-sensitive type.

$c$ represents the ordinary receiver.

$d$ represents the upper cell of the recording instrument, and $e$ represents the lower cell thereof, which cells are coupled by a tube $d'$, and the cell $e$, which contains the recording-diaphragm proper, is carried in a holder mounted with capability of slightly turning upon the tube $d'$ for the purpose hereinafter described, and $f$ represents the cell of the message-reproducing diaphragm.

The recording instrument $d\,e$ is carried by a curved arm $g$, which is pivotally mounted with capability of laterally sliding upon a guide-bar $g'$, at its ends carried in brackets $a'$ from the base-plate $a$, and the arm $g$ near to its pivotal point is furnished with a spring-offset $g^2$, at its lower end carrying a half-nut $g^3$, which engages the ordinary feed-screw $h$, which is coupled with and driven by the usual electromotor (not shown) in the manner well known, by which means the recording instrument $d\,e$ is traversed longitudinally of the phonogram-blank $x$, placed upon the mandrel $i$, which is assumed to be mounted and driven in the manner customary in phonographic instruments. The arm $g$ is hollow and has mounted therein the usual magnets, which, however, must be of a powerful character, and connections necessary to actuate the diaphragm $d^2$ in the upper cell $d$ of the recording instrument, and said arm near to its pivotal point is provided with terminals $g^4$, to which are coupled the line-wires, which, however, are not shown. The free end of the arm $g$ is steadied by means of a saddle $j'$, which is carried by a collar $j^2$, mounted on the cell $e$ of the recording instrument, and this saddle $j'$ rests upon a guide-bar $k$, which at its ends is flattened and provided with vertical slots $k'$, which receive studs $l'$, carried by posts $l$, fixed with the base-plate $a$, and the guide-bar $k$ is loosely carried in curved seats or rests $k^3$, provided at the upper part of a plate-like bar $k^2$, which is carried by links $k^4$, at their upper ends pivotally connected to the bar $k^2$ and at their lower ends pivotally carried by lugs $a^2$ from the base-plate $a$.

Transversely of the bar $k^2$ and at one end mounted at $a^3$ in that part of the frame $a$ carrying the scale-bar $a^*$ and at the other end mounted in a lug $a^4$ from the base-plate $a$ is a short shaft $k^5$, upon which is fixed beneath the bar $k^2$ a cam $k^6$, formed with a nose or point $k^7$ thereon, while the front end of the shaft $k^5$ is furnished with a crank-handle $k^8$, by means of which the shaft $k^5$ may be rotated, so that by turning said shaft $k^5$ a quarter-revolution the cam $k^6$ will raise the bar $k^2$, and consequently the recording instrument, and at the same time disengage the nut $g^3$ from the feed-screw $h$, thus throwing the recording instrument out of action, and the parts will thus be retained by the nose $k^7$ of the cam $k^6$ until the shaft $k^5$ is rotated in the opposite direction either by hand or by the electric device hereinafter described.

The mouthpiece $b'$ of the transmitter $b$ is provided with two channels, as it were, for the sound-waves—that is to say, the sound-waves produced by speaking into the mouthpiece $b'$ travel directly through a tube, channel, or conduit $b^2$ to the recording-diaphragm $e^4$ of the cell $e$ of the recording instrument at the transmitting-station and cause the cutting-tool $e^2$ of the lever $e'$, actuated by the diaphragm, to record the conversation upon the phonogram-blank $x$, carried by the mandrel $i$, and at the same time these sound-waves are electrically conveyed over the line-wire $b^*$ to a similar instrument, which for the time being is the receiving instrument, at the distant station and pass by the terminals $g^4$ of the arm $g$ through the electromagnets of the diaphragm-disk of the cell $d$ of the distant recording instrument, which, as hereinafter described, is or may be coupled with the diaphragm-disk of the cell $e$, so that the sound-waves are similarly recorded at the distant station upon a phonogram-blank, such as $x$, while at the same time the conversation can be heard through the receiver $c$ of the distant instrument, which is electrically connected with the recording instrument.

The lever $e'$ of the recording instrument $d\,e$ is provided with two points, (see Figs. 1 and 7,) one, $e^2$, a cutting instrument for recording on the phonogram-blank $x$ and the other, $e^3$, a blunt stylus for following the groove or incision formed by the cutting instrument, and the cell $e$ of the recording instrument is mounted with capability of turning upon the tube $d'$, so that said cell may be slightly rotated to throw the cutting-tool out of action and the blunt stylus into action, or vice versa, in the well-known manner described in Letters Patent of Thomas A. Edison, No. 465,972, dated December 29, 1891, and thus the conversation may be reproduced by the instrument at either the transmitting or distant receiving station at will, and to enable said reproduction to be heard a listening-tube $d^*$ is connected with the tube $d'$ of the recording instrument $d\,e$.

The tubes $b^2$ and $d^*$ may be run together and have a common connection with the recording instrument.

The recording instrument is of special construction—that is to say, it is provided with two compartments $d\,e$, the upper one $d$ of which is an electrical telephone-receiver and the lower one $e$ of which is provided with a sensitive disk of glass $e^4$ or other suitable substance which receives the undulations produced by the natural sound-waves by way of the channel $b^2$ or sound-waves produced electrically through the electromagnets within the arm $g$, acting on the diaphragm $d^2$, and communicates them to the lever $e'$, carrying the recording-stylus $e^2$ or other suitable tool underneath. Below the diaphragm $e^4$, of glass, is provided an apertured cover or guard $e^5$. The diaphragm-cell $e$ (see Fig. 7) is also provided with an apertured floating weight $e^6$, on which is pivotally mounted upon a stud $e^{6*}$ the lever $e'$, which carries the recording and reproducing tools $e^2\,e^3$, and this floating weight $e^6$ is mounted upon a loose hinge $e^7$ to admit of the reproducing-stylus $e^3$ readily following the channel or groove of the phonogram. Floating weights have been previously employed in a similar manner in phonograph apparatus, the object thereof being to enable the reproducing and cutting tools employed in said instruments to override any irregularities in the surface of the cylinder, the material of which the latter is made being liable to expansion and contraction; but it has been found by experiment that the revolving motion of the cylinder over which the stylus travels causes the floating weight to jump or rebound, and this obviously prevents the acting tool from properly fulfilling its function. In order to obviate this defect, the floating weight $e^6$ is, according to the present invention, made adjustable to said inequalities by means of a spring $e^8$, which at one end bears upon the floating weight $e^6$ and at the other end acts against a disk $e^9$, fixed with a regulating-screw $e^{10}$, screwing through a nut $e^{11}$, so that the force exerted by the spring upon the floating weight $e^6$ may be regulated at will, and in order to limit the maximum downward movement of the floating weight $e^6$ a stop $e^{12}$ is provided, consisting of a headed stud fixed with the frame $e$ and passing through an aperture in the weight $e^6$. By the aid of the device lastly hereinbefore described the jumping action of the floating weight is modified or prevented, and the spring $e^8$, while permitting the necessary up-and-down movement of the recording-stylus $e^2$ to adjustably follow the inequalities of the surface of the phonogram-blank, at the same time increases the impulses of the vibrations created by the sound-waves and causes the same to make a deeper cut or incision than heretofore, with the result that when reproduced the sounds are also increased, while the reproducing-stylus $e^3$ is similarly caused to more closely and adjustably follow the groove of the phonogram.

The recording instrument $d\,e$ is, as hereinbefore described, provided with a separate channel $b^2$ for receiving the non-electrical sound-waves which are to act upon the diaphragm $e^4$ of the recording instrument $d\,e$— that is to say, that part of the sounds which has to be recorded at the transmitting-station directly without the aid of the transmitter $b$ and concurrently with its electrical conveyance by the line-wire $b^*$ to the terminals $g^4$ of the receiving apparatus at the distant station, where it passes through the arm $g$ and recording instrument $d\ e$ and is similarly recorded, as hereinbefore described.

The recording part of the instrument can, as hereinbefore explained, be put out of action when desired by simply turning the handle $k^8$, thus raising the recording instrument $d\ e$ and throwing the feed mechanism $g^3\ h$ out of gear, when the telephonic transmitter $b\ b'$ and receiver $c$ may be used as an ordinary telephone.

The scale-bar carried by part of the frame $a$ is provided with a divided and numbered scale $a^*$, as shown more particularly at Fig. 8, over which when the instrument is in operation travels an index or pointer $j^3$, carried by the saddle $j'$, resting upon the slide-bar $k$, and also loosely mounted upon the slide-bar $k$ is an indicator or marker $k^*$, and the object of this arrangement is to record by the stationary indicator $k^*$ the position at which the conversation commenced and by the traveling hand or pointer $j^3$ the position at which it terminated, and the operator is thus enabled to make a note in a register of these particulars, by which means he can at any future time at once select any particular message for reproduction by the instrument.

From the foregoing it will be understood that the conversation may be conveyed to one or more telephone-receivers at a distance concurrently with the recording of the conversation at the transmitting-station and that the conversation recorded upon the phonogram-cylinder $x$, as hereinbefore described, can be reproduced afterward as many times as desired by bringing into the track of the record the reproducing-stylus $e^3$ of the reproducer $d\ e$.

For the reproduction of short messages a separate reproducer is preferably employed, and for that purpose the reproducer $f$, which is separately represented at Figs. 5 and 6 and is substantially the same as the lower part of the recording instrument hereinbefore described and the details of which are therefore unlettered, is supported in a holder $f'$, which is formed with an offset $f^2$, which is received between and pivotally mounted in the limbs of the fork $f^5$ of a lever $f^4$, which is mounted upon a vertical axis $f^6$, carried by a bracket $a^5$ from the frame $a$, and this lever is on one side acted upon by a spring $f^7$, which moves it in one direction, while a cam $f^8$, rotated at the times desired in the manner hereinafter described, moves it in the opposite direction, and thus the diaphragm $f$ is traversed over the short phonogram-cylinder $x'$, hereinafter more particularly referred to. The phonogram upon the short cylinder $x'$ is produced by placing it upon the mandrel $i$ in position beneath the instrument $d\ e$, bringing the stylus $e^2$ into action, switching on the motor, and speaking at the mouthpiece $b'$, and it is then shifted along the mandrel into the position indicated by the dotted lines $x'$ in Fig. 2 in readiness for use. The sound-box $f$ is adapted to be turned upon its pivotal point at $f^5$ to raise it out of action, as indicated at Fig. 1, or to be lowered onto the phonogram $x'$ when it is desired to reproduce a message, and in order to raise and hold it out of action when desired a lever or detent $m$, formed with a rounded nose or cam, Fig. 3, is employed, which is mounted upon an axis $m'$, said lever being actuated by a rod $m^2$, provided with a handle $m^3$. The short message reproduced by the diaphragm $f$ from the phonogram $x'$ passes by the tube $f^*$ to the telephone-transmitter $b$, which is intended to present a face rearward to the tube $b^*$ as well as a face forward to the mouthpiece $b'$, whence it passes over the line-wire $b^*$ to the receiving instrument at the distant station.

In order to give the required rotary motion to the cam $f^8$, said cam is fixed upon the upper end of a shaft $f^9$, Fig. 3, mounted with capability of revolving in a bearing $f^{10}$ in the bracket $a^5$, while at its lower end it is mounted in a bearing $f^{11}$ in the base-plate $a$, and this shaft has also fixed thereon a beveled wheel $f^{12}$, which gears with a corresponding wheel $f^{13}$, fixed upon one end of a short shaft $f^{14}$, mounted in a boss or bearing $a^6$, formed on the frame $a$, while at its other end it has fixed thereon a band wheel or pulley $f^{15}$, which by a band $f^{16}$ is coupled with the pulley upon the shaft of the electromotor which gives motion to the mandrel $i$ and feed mechanism and which is not shown, inasmuch as it is well known to persons acquainted with phonographic instruments. The sound-box $f$ thus receives a traverse to and fro over the short phonogram $x'$, and in order that after traversing said phonogram from its initial point to the termination of the phonogram its stylus may not in its return motion again traverse the same a segmental cam $f^{17}$ is fixed upon the shaft $f^9$ and is or must be so arranged and timed that in the revolution of the shaft $f^9$ it will act against the under faces of curved offsets $f^3$ from the holder $f'$ and lift the sound-box $f$ upon its hinge $f^2$, and thus hold it during its return traverse to its starting-point, when said cam will allow the sound-box to descend, with its reproducing-stylus again in engagement with the phonogram $x'$. In the event of the electric circuit being broken, for example, at the exchange by ringing off after the delivery of the message and at the termination of the outer traverse of the sound-box at the distant station and before the sound-box has returned to its zero-point, the next ringing-up and completion of the circuit will cause the sound-box to return to zero and again reproduce the message, and so on.

In order to enable the recording instrument $d\ e$ at the distant station to be brought into action, assuming it to have been thrown out of action by turning the handle $k^8$ and raising the slide-bar $k$ and disengaging the feed mechanism $g^3\ h$, as hereinbefore described, the following simple device is employed, which is represented at Figs. 8 and 9: Upon the shaft $k^5$, in addition to the cam $k^6$, formed with the nose or point $k^7$, is a disk $k^{10}$, provided with a notch $k^{11}$, and in connection therewith is employed a hook $n$, mounted upon an axis of motion $n'$, carried by the armature $n^3$ of an electromagnet $n^4$, and which is kept up to its work by a spring $n^2$, and the tooth of the hook in the acting position of the nose $k^7$ of the cam $k^6$—that is, when the slide-bar $k$ is raised—engages the notch $k^{11}$ of the disk $k^{10}$. When magnet $n^4$ is sufficiently energized, it starts rotation of the disk $k^{10}$ till nose $k^7$ is thrown beyond its center of support, when the parts will assume the position shown in Fig. 8 under the weight of the carriage-bar $k^3$. The electromagnet $n^4$ is placed in the ordinary telephone-circuit, but is so formed or arranged that the ordinary current is not sufficient to actuate it in the manner desired, but at each station is provided a supplemental battery or other source of additional electricity, which is adapted to be brought into the ordinary circuit by the pressing of a button, by which means the electromagnet $n^4$ will be caused to attract the armature $n^3$, and the hook $n$ will rotate the disk $k^{10}$ and shaft $k^5$ sufficiently to dislodge the nose $k^7$ of the cam $k^6$ from the bar $k^2$, thereby permitting the instrument $d\ e$ to descend into position for use.

It will be obvious that any other well-known electrical device may be employed for effecting the above object.

As a modification of this device the instrument $d\ e$ may be automatically thrown into and out of action, for example, by the following means: The bar $k^2$ and instrument $d\ e$ may be normally held raised by a spring and the armature $n^3$ connected to the bar $k^2$, so that while the button at the distant station is depressed the armature $n^3$ will be attracted by the magnet $n^4$, which must be of a powerful character, and the instrument $d\ e$ will be held in action, while immediately that said button is released the instrument will be raised out of action by the spring. This arrangement of parts is so easily understood that it is not thought necessary to illustrate the same.

By the means hereinbefore described a telephonic message could be recorded without the presence of a person being necessary at that instrument for the time being the receiving instrument in the following manner: After office hours or in the event of an office having a telephonograph being left temporarily unattended a short phonogram-cylinder, such as $x'$, would previously be placed upon the mandrel $i$, as indicated by the dotted lines in Fig. 2, said phonogram bearing the required short message—such, for example, as the following: "Nobody in. Mr. Brown will be back at four o'clock. Please press the button and I will take the message, and Mr. Brown will ring you up when he arrives." The person (Mr. Brown) at the home station would then press in the knob $m^3$, thus bringing the diaphragm $f$ into action, after which he would be free to go out. The person at the distant station desiring to communicate with Mr. Brown would then ring up the exchange and the exchange would ring up Mr. Brown's switch in Brown's circuit, thereby completing the circuit through Brown's actuating-motor and starting the instrument and causing the above message to be conveyed, by the diaphragm $f$, conduit $f^*$, and line-wire $b^*$, to the distant station. The person at the distant station finding that Mr. Brown was out and wishing to leave a message with him would then press the button, which would have the effect of bringing into action the electromagnet $n^4$ and lowering the instrument $d\ e$ into position for use, as hereinbefore described, and he could then send his message over the line-wire to the home station, where it would be recorded by the instrument $d\ e$ upon the phonogram-blank $x$. He would then ring off and exchange would cut out Brown's circuit, thus arresting the actuating-motor, and the repeating diaphragm, with the repeating sound-box $f$, would in the next ringing up automatically return to its initial position and again traverse the phonogram $x'$ and repeat to any subsequent caller at any other distant station the same answer previously mentioned. Upon Mr. Brown's return to office he would see that the pointer $j^3$ of the instrument $d\ e$ had moved with relation to the scale $a^*$, and this circumstance would tell him that some one had left a message with his machine while he had been out, and he could then by switching on the motor and bringing into action the reproducing-point $e^3$ of the instrument $d\ e$ and listening at the listening-tube $d^*$ hear the message reproduced.

It will be understood that the details of construction and arrangement of the various parts of the apparatus are capable of considerable modification without departing from the principle of the invention. For example, the sound-waves might be electrically conveyed from the transmitter $b$ to the recording instrument $d\ e$; but this arrangement is considered inferior to that hereinbefore described.

Having now particularly described and ascertained the nature of the said invention and in what manner the same is to be performed, I declare that what I claim is—

1. A combined telephonic and phonographic instrument comprising phonographic and electrotelephonic diaphragms connected together to cause either to be actuated by the other, sound-boxes containing said diaphragms and connected together by a tube, a mouthpiece provided with a telephonic transmitter and a sound-duct from the mouthpiece to the connecting-tube of the aforesaid sound-boxes; substantially as and for the purposes set forth.

2. In combination with a phonograph having a suitable carriage and a sound-box mounted on said carriage and containing a diaphragm and stylus connected with said diaphragm, a telephonic receiver also mounted upon said carriage, and having its sound-box in communication with the sound-box of the phonograph by a duct and a telephonic transmitter having a mouthpiece which is also in communication with the duct communicating between the sound-boxes on the phonograph-carriage; substantially as herein set forth.

3. In combination with a phonograph having a suitable carriage, and a recorder mounted thereon, a telephonic receiver also mounted on said carriage and in communication with the recorder, a telephonic transmitter having a mouthpiece, which is in communication with both the receiver and recorder on the carriage, and an additional phonographic instrument mounted independently of the said carriage and communicating with the telephonic transmitter; substantially as and for the purposes set forth.

4. In an instrument of the character described, comprising a telephone and a phonograph, an electrically-actuated means for throwing the phonograph into action, consisting of a rotating cam by which the phonograph-carriage is normally held out of action, an electromagnet and an armature therefor, and a hook connected with said armature and engaging said cam; substantially as set forth.

5. In a phonograph the combination of the guide-bar $k$, the posts $l$, upon which said guide-bar is mounted by slot-and-pin connection, the bar $k^2$ supporting said bar $k$, the guide-links $k^4$ connecting bar $k^2$ with fixed points, and the lifting-cam $k^6$; substantially as and for the purpose set forth.

6. In a phonograph the combination of the bar $k$, the posts $l$ upon which said bar is mounted by slot-and-pin connection, the bar $k^2$ supporting said bar $k$, the guide-links $k^4$ connecting bar $k^2$ with fixed points, the lifting-cam $k^6$, a hook $n$, engaging said cam, and an electromagnet controlling said hook.

7. In a phonograph the combination with a stylus, of the floating weight suitably pivoted at one end and providing at an intermediate point a mounting for the stylus, a stop limiting the movement of the free end of the weight in one direction, a spring pressing said free end toward said stop, and a set-screw applying pressure to the spring; substantially as and for the purposes set forth.

8. In combination with a phonograph and a sound-box having movement perpendicular and parallel to the surface of the record, the rotating segment for raising the sound-box during its movement in one direction; substantially as and for the purposes set forth.

9. In combination with a phonograph having a sound-box movable both perpendicularly and parallel to the record, a rotating cam imparting said parallel movement in one direction, means for imparting said parallel movement in the opposite direction, and a rotating segment elevating the sound-box during the movement by the cam; substantially as set forth.

10. In a phonograph the combination of a sound-box movable perpendicularly and parallel to the record, a spring imparting the parallel movement in one direction, a shaft bearing a cam which moves the sound-box in opposition to the spring, and a lifting-segment also carried by said shaft, rotating with the cam and elevating the sound-box during the movement by the cam; substantially as and for the purpose set forth.

11. In a phonograph the combination with a sound-box movable to and from the record, the pivoted lever $m$ engaging beneath the sound-box to hold it in elevated position, and the push-rod $m^2$ connected at its end with the lever, and movable longitudinally to control the position of said lever relatively to the sound-box; substantially as set forth.

JULES ERNEST OTHON KUMBERG.

Witnesses:
C. MELBOURNE WHITE,
THOMAS V. GRAFTON.